United States Patent Office 3,513,692
Patented May 26, 1970

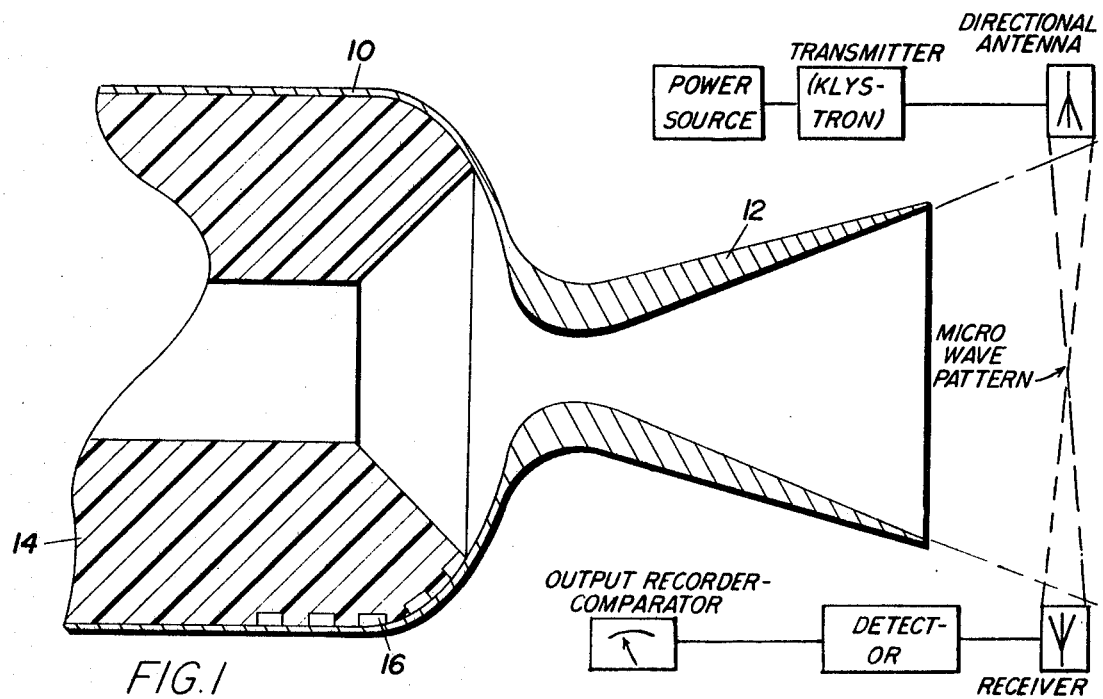
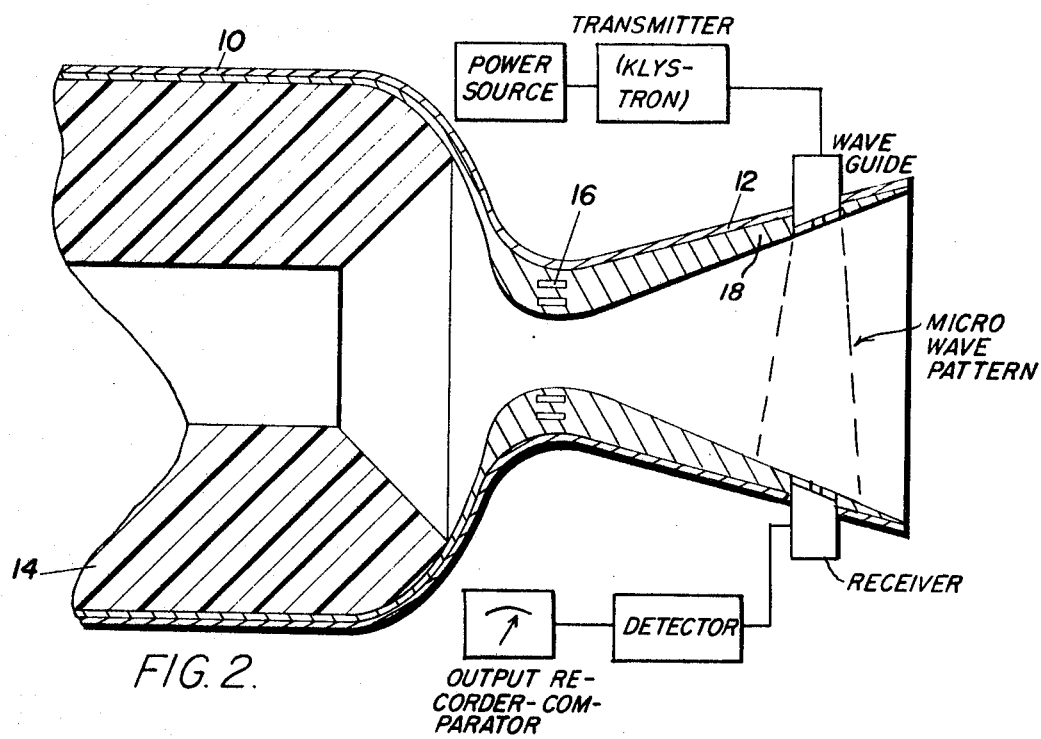

3,513,692
EROSION MEASURING DEVICE
Murray C. Slone, Brigham City, Utah, assignor to Thiokol Chemical Corporation, Bristol, Pa., a corporation of Delaware
Filed Sept. 19, 1966, Ser. No. 580,234
Int. Cl. G01n 17/00
U.S. Cl. 73—86    9 Claims

ABSTRACT OF THE DISCLOSURE

A device and method for determining erosion and/or propellant burn-back in solid propellant rocket motor components during operation of the motor is disclosed. Ionizable elements embedded in the component exposed to hot gases of the motor become themselves exposed to the gases as burn-back or erosion progresses. Upon burning they ionize and the ions enter the gas stream changing the electromagnetic microwave characteristics thereof. This change is detected by attenuation of a microwave directed through the gas stream which generates a signal that is electronically analysed to provide erosion or propellant burn-back data.

---

This invention pertains to measurement within a rocket motor. More particularly, by means of this invention the rate of erosion of erodable components and the burn-back of solid propellant are measured during firing of the rocket motor.

Because of the high temperature and velocity of the propellant gases, important components of a rocket motor, such as its thrust nozzle, are eroded during firing, resulting in damage to, and sometimes failure of, the motor. Hence, measurement of the erosion during the flight or testing of a rocket motor is extremely useful, as it will provide a means for monitoring performance of the rocket motor and, if necessary, warn of an incipient failure in time to allow the mission to be aborted without loss of life. Similarly, measurement of the burn-back of the propellant surface during firing is desirable.

There are, of course, many difficulties in making measurements of component erosion and propellant burn-back while a rocket motor is firing. As weight is such a critical factor, the measuring means should be light. It must also be reliable. Measurement systems which include mechanical linkage and other structure have the inherent disadvantage of weight and bulk. Moreover, the portion of such systems positioned within the rocket motor and exposed to the hot combustion gas is adversely affected thereby. For these and other reasons a need has existed for a simple, lightweight and reliable means for measurement within a rocket motor during its firing.

It is, therefore, an object of this invention to provide means for making measurement of component erosion within a rocket motor during firing thereof.

Another object of this invention is to provide reliable measurement of rocket propellant burn-back.

These and other objects are accomplished in accordance with the present invention by indicator means positioned within the solid propellant, or other component, of a rocket motor. Erosion or propellant burn-back exposes the indicator means to the hot combustion gas, whereupon the indicator means is ionized and carried out the thrust nozzle of the rocket with the combustion gases, altering the microwave transmission characteristics thereof. Attenuation of a microwave directed through the exhaust gases gives a signal that is electronically reduced to provide accurate data of component erosion or propellant burn-back.

The invention will be readily understood by consideration of the following detailed description of preferred embodiments thereof, in which reference is made to the accompanying drawings wherein:

FIG. 1 is a fragmentary longitudinal sectional view of a rocket motor utilizing an embodiment of this invention for measuring propellant burn-back and showing, in block form, representative microwave transmission and receiving means utilized in ground or static motor testing;

FIG. 2 is a fragmentary longitudinal sectional view of a rocket motor utilizing an embodiment of this invention for measuring erosion of insulation and showing in block form, microwave transmission and receiving means utilized in connection with a vehicle in flight.

Throughout the specification and drawings like reference numbers designate like parts.

In FIG. 1 there is illustrated a rocket motor comprising a casing 10 with a thrust nozzle 12 integrally joined thereto. The rocket motor has a solid propellant grain 14, with indicator elements 16 disposed therein, five of which are shown. For clarity, the size of the indicator elements is exaggerated. Included in the composition of the indicator elements is a material, such as KCL, KOH, $K_2CO_3$, or $KHCO_3$, adapted to ionize when burn-back of the propellant exposes the material to the hot combustion gas. It will be apparent that various compositions may be used other than those stated, without departing from the scope of this invention. Compounds containing at least one of the alkali metals are particularly effective.

Upon ionization, the volatilized material mixes with the hot combustion gas and passes out the thrust nozzle 12 as part of the exhaust plasma. The presence of ionized indicator element material in the exhaust plasma changes its microwave transmission characteristics.

FIG. 1 shows in diagrammatic form a microwave transmission and receiver system for detecting the changes in microwave transmission characteristics of rocket motor 10 exhaust plume during ground or static testing. Power from the electrical power source operates the microwave (klystron tube) generator or transmitter producing in conjunction wtih the directional antenna, a patterned beam of radio frequency waves (microwaves), which is directed through the exhaust plume of rocket motor 10. The exhaust plume absorbs some of these microwaves and the remainder pass through to the receiver antenna and the detector, are amplified and converted to power impulses in the recorder-comparator as an output voltage, or signal proportional to the microwaves received. Thus, by appropriate means (i.e., power indicators, not shown) power input and power output is compared in the recorder-comparator and balanced by an additional voltage supplied to the output voltage. The additional voltage is a measure of the microwave loss, i.e., change, in the exhaust gas medium or plume. Thus while motor 10 is operating the input-output voltage comparator-recorder will be "normal." As an element 16 is consumed or combusted, ionization occurs which is carried into the exhaust plume changing its microwave transmission characteristics, which change is detectable and recorded by the system shown in the figures. Thus in static tests of a rocket motor the microwave transmitter and receiver are positioned on opposite sides of the exhaust jet, and, of course, it would not be necessary that either the transmitter or receiver be physically attached to the rocket motor. This arrangement will also provide flight measurement of propellant burn-back, although the transmitter and/or the receiver can be fixed to the rocket motor adjacent the nozzle exit.

In FIG. 2 there is illustrated another embodiment of the invention wherein indicator elements 16 (four shown) are disposed in insulation 18 which protects thrust nozzle 12. Again the size of the indicator elements is exaggerated for clarity. When the insulation is eroded so as to expose an indicator element to the hot combustion gas, measurement of the erosion is effected in the same manner as previously described herein.

It will be apparent that various embodiments of this invention can be utilized without departing from the scope of the invention. The indicator elements may be positioned within ablative materials, in joints of the rocket motor assembly, and in so-called "split flaps" of solid propellant bonding assemblies. Although the invention has been illustrated in use with solid propellant rocket motors, it will be understood that embodiments can be utilized in liquid propellant rocket motors.

The amount of indicator element material required to accomplish measurement in accordance with the invention is small, as minute quantities of ionized indicator element material are readily detectable in the exhaust gas. Where the invention is used to measure several parameters concurrently, the amounts of material in the indicator elements positioned within the respective components are varied in size, thereby allowing differentiation of the respective signals.

What is claimed is:

1. In a rocket motor having at least one component formed with surfaces exposed, and therefore subjected to removal of at least a portion of the material thereat by the combustion gases produced in said motor, a device for altering the microwave transmission characteristics of the motor exhaust plasma, comprising:
   at least one indicator element disposed within said component so as to be contacted and volatilized by said combustion gases as said component material in said exposed surfaces is removed by said gases;
   said element formed of an ion producing substance when volatilized; whereby said ions pass into said combustion gases and into said exhaust plasma altering the microwave transmission characteristics thereof.

2. The invention of claim 1 wherein the ion producing substance contains at least one metal selected from the group consisting of potassium, sodium, lithium, rubidium, cesium and francium.

3. The invention of claim 1 wherein the exposed component is an erodable nozzle and said indicator element is disposed within said nozzle so as to be contacted and volatilized by said combustion gases upon erosion of said nozzle internal surface.

4. The invention of claim 3 wherein said element is disposed in a plurality thereof, each element radially spaced apart in said nozzle.

5. The invention of claim 1 wherein said exposed component is a solid propellant grain and said indicator element is disposed within said grain and is ionized upon combustion therewith.

6. A process for altering the microwave transmission characteristics of a rocket motor exhaust plasma to determine the rate of removal of material from the surfaces of components of the motor exposed to the combustion gases thereof comprising the steps of:
   positioning at least one volatilizable, ion producing substance within said component whereby said substance is contacted by said combustion gases after removal of at least a portion of material from said component; said ions produced thereby passing into the exhaust plasma;
   transmitting a microwave beam through said exhaust plasma to a microwave receiver;
   detecting on said receiver the alterations in said microwave beam caused by said ions after passing into said exhaust plasma, thereby providing data for determining the rate at which material is removed from said component surface by said combustion gas.

7. The process of claim 6 wherein the ion producing substance contains at least one metal selected from the group consisting of potassium, sodium, lithium, rubidium, cesium and francium.

8. The process of claim 6 wherein the exposed component is an erodable nozzle and the ion producing substance is disposed within said nozzle at its throat so as to be contacted and volatilized by said combustion gas upon erosion of the material thereat.

9. The process of claim 8 wherein said ion producing substance is disposed in said nozzle in a plurality of radially spaced apart, minute elements.

References Cited

UNITED STATES PATENTS 3,357,237    12/1967    Le Bel _____ 73—86

RICHARD C. QUEISSER, Primary Examiner

C E. SNEE III, Assistant Examiner

U.S. Cl. X.R.

250—83.6; 325—67